US009335546B2

United States Patent
Kinno et al.

(10) Patent No.: US 9,335,546 B2
(45) Date of Patent: May 10, 2016

(54) IMAGE DISPLAY DEVICE AND HEAD MOUNTED DISPLAY

(71) Applicant: Kabushiki Kaisha Toshiba, Minato-ku (JP)

(72) Inventors: Akira Kinno, Kanagawa-ken (JP); Aira Hotta, Kanagawa-ken (JP); Akihisa Moriya, Kanagawa-ken (JP); Takashi Sasaki, Kanagawa-ken (JP); Haruhiko Okumura, Minato-ku (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 137 days.

(21) Appl. No.: 14/202,021

(22) Filed: Mar. 10, 2014

(65) Prior Publication Data

US 2014/0334008 A1    Nov. 13, 2014

(30) Foreign Application Priority Data

May 13, 2013    (JP) .................................. 2013-101647

(51) Int. Cl.
*G02B 27/01*    (2006.01)
(52) U.S. Cl.
CPC ...... *G02B 27/017* (2013.01); *G02B 2027/0152* (2013.01); *G02B 2027/0178* (2013.01)
(58) Field of Classification Search
CPC ............... G02B 27/01; G02B 27/0101; G02B 27/0149; G02B 2027/0152; G02B 2027/0161; G02B 27/017; G02B 27/0179; G02B 2027/0192; G02B 2027/0178
See application file for complete search history.

(56) References Cited

FOREIGN PATENT DOCUMENTS

| JP | 2006-133376 | * | 5/2006 | ............. G02B 27/02 |
| JP | 2006-133376 | A | 5/2006 | |
| JP | 2007-97198 | | 4/2007 | |
| JP | 2009-65440 | | 3/2009 | |

OTHER PUBLICATIONS

Office Action issued Apr. 2, 2015 in Japanese Patent Application No. 2013-101647 (with English language translation).

* cited by examiner

*Primary Examiner* — Joseph P Martinez
(74) *Attorney, Agent, or Firm* — Oblon, McClelland, Maier & Neustadt, L.L.P.

(57) ABSTRACT

According to one embodiment, an image display device includes a holder. The holder includes a holding member, a first extension portion, and a second extension portion. The holding member has a first end, and a second end separated from the first end, and includes a first portion, and a second portion. The first extension portion is connected to the first end. The second extension portion is connected to the second end and arranged with the first extension portion. The device includes a light emitting unit, and an optical unit. The light emitting unit is configured to be mounted on the first extension portion and to emit light including an image. The optical unit is configured to be mounted on the first portion and to change a travel direction of the light by reflecting the light.

8 Claims, 6 Drawing Sheets

US 9,335,546 B2

IMAGE DISPLAY DEVICE AND HEAD MOUNTED DISPLAY

CROSS-REFERENCE TO RELATED APPLICATIONS

This application is based upon and claims the benefit of priority from Japanese Patent Application No. 2013-101647, filed on May 13, 2013; the entire contents of which are incorporated herein by reference.

FIELD

Embodiments described herein relate generally to an image display device and a head mounted display.

BACKGROUND

There is a head mounted display (HMD) in which a display unit is provided in front of an eye of a user. For example, the display unit of the HMD is provided at one or both sides of glasses. For such a HMD, the frontward portion is heavier than that of general glasses; and the user feels discomfort. Therefore, it has been proposed to move the center of gravity of the entire device rearward of the nosepiece of the glasses, or adjust the position of the center of gravity by providing a weight. However, such proposals are insufficient to eliminate the discomfort; and it is desirable to reduce the discomfort particularly during usage over a long period of time.

DETAILED DESCRIPTION

Figure 1:
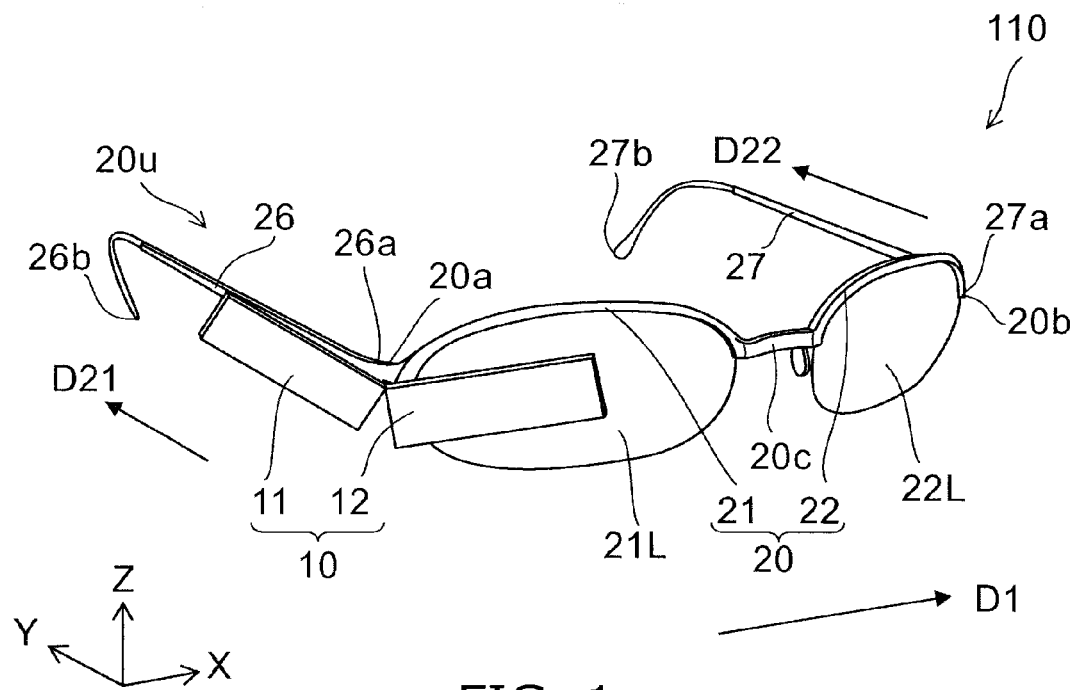
FIG. 1 is a schematic perspective view showing an image display device and a head mounted display according to a first embodiment.

According to one embodiment, an image display device includes a holder. The holder includes a holding member, a first extension portion, and a second extension portion. The holding member extends in a first direction. The holding member has a first end, and a second end separated from the first end in the first direction. The holding member includes a first portion positioned between the first end and a midpoint of the holding member in the first direction, and a second portion positioned between the midpoint and the second end. The first extension portion extends in a direction intersecting the first direction to be connected to the first end. The second extension portion extends in a direction intersecting the first direction to be connected to the second end. The image display device includes a light emitting unit, and an optical unit. The light emitting unit is configured to be mounted on the first extension portion. The light emitting unit is configured to emit light including an image. The optical unit is configured to be mounted on the first portion. The optical unit is configured to change a travel direction of the light emitted from the light emitting unit to a direction intersecting the first direction by reflecting the light. A first total weight is not less than 1.6 times and not more than 3.5 times a second total weight. The first total weight is a sum of a weight of the light emitting unit, a weight of the optical unit, a weight of the first portion, and a weight of the first extension portion. The second total weight is a sum of a weight of the second portion and a weight of the second extension portion.

According to one embodiment, a head mounted display includes a holder, and an image display device. The holder includes a holding member extending in a first direction, the holding member having a first end, and a second end separated from the first end in the first direction, the holding member including a first portion positioned between the first end and a midpoint of the holding member in the first direction, and a second portion positioned between the midpoint and the second end, a first extension portion extending in a direction intersecting the first direction to be connected to the first end, and a second extension portion extending in a direction intersecting the first direction to be connected to the second end and arranged with the first extension portion in the first direction. The image display device includes a light emitting unit configured to be mounted on the first extension portion, the light emitting unit being configured to emit light including an image, and an optical unit configured to be mounted on the first portion, the optical unit being configured to change a travel direction of the light emitted from the light emitting unit to a direction intersecting the first direction by reflecting the light. A first total weight is not less than 1.6 times and not more than 3.5 times a second total weight. The first total weight is a sum of a weight of the light emitting unit, a weight of the optical unit, a weight of the first portion, and a weight of the first extension portion. The second total weight is a sum of a weight of the second portion and a weight of the second extension portion.

According to one embodiment, an image display device is configured to be mounted on a holder. The holder includes a holding member extending in a first direction, the holding member having a first end, and a second end separated from the first end in the first direction, the holding member including a first portion positioned between the first end and a midpoint of the holding member in the first direction, and a second portion positioned between the midpoint and the second end, a first extension portion extending in a direction intersecting the first direction to be connected to the first end, and a second extension portion extending in a direction intersecting the first direction to be connected to the second end and arranged with the first extension portion in the first direction. The image display device includes a light emitting unit configured to be mounted on the first portion, the light emitting unit being configured to emit light including an image, and an optical unit configured to be mounted on the first portion, the optical unit being configured to change a travel direction of the light emitted from the light emitting unit to a direction intersecting the first direction by reflecting the light. A first total weight is not less than 1.6 times and not more than 3 times a second total weight. The first total weight is a sum of a weight of the light emitting unit, a weight of the optical unit, a weight of the first portion, and a weight of the first extension portion. The second total weight is a sum of a weight of the second portion and a weight of the second extension portion.

According to one embodiment, a head mounted display includes a holder, and an image display device. The holder includes a holding member extending in a first direction, the holding member having a first end, and a second end separated from the first end in the first direction, the holding member including a first portion positioned between the first end and a midpoint of the holding member in the first direction, and a second portion positioned between the midpoint and the second end, a first extension portion extending in a direction intersecting the first direction to be connected to the first end, and a second extension portion extending in a direction intersecting the first direction to be connected to the second end and arranged with the first extension portion in the first direction. The image display device includes a light emitting unit configured to be mounted on the first portion, the light emitting unit being configured to emit light including an image, and an optical unit configured to be mounted on the first portion, the optical unit being configured to change a travel direction of the light emitted from the light emitting unit to a direction intersecting the first direction by reflecting the light. A first total weight is not less than 1.6 times and not more than 3 times a second total weight. The first total weight is a sum of a weight of the light emitting unit, a weight of the optical unit, a weight of the first portion, and a weight of the first extension portion. The second total weight is a sum of a weight of the second portion and a weight of the second extension portion.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

FIG. 1 is a schematic perspective view showing an image display device and a head mounted display according to a first embodiment.

Figure 2:
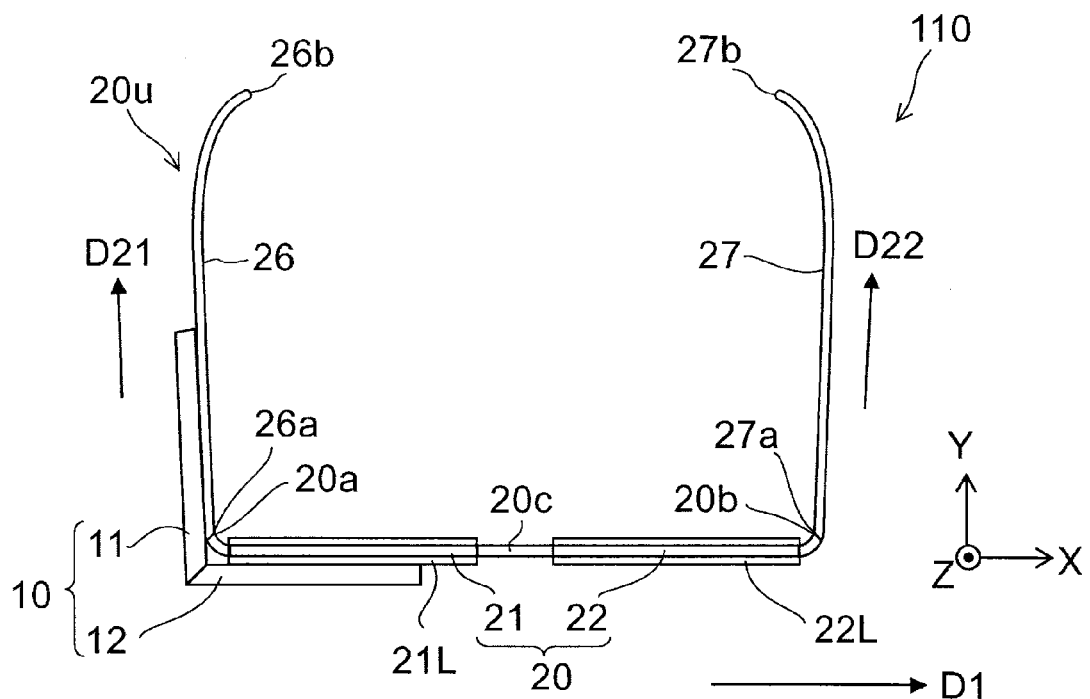
FIG. 2 is a schematic plan view showing the image display device and the head mounted display according to the first embodiment.

FIG. 2 is a schematic plan view showing the image display device and the head mounted display according to the first embodiment.

As shown in FIG. 1 and FIG. 2, the head mounted display 110 according to the embodiment includes the image display device 10 and a holder 20u.

The holder 20u may be, for example, a portion of glasses. The glasses may be used as the holder 20u. The image display device 10 is used by being mounted on the holder 20u.

An example of the holder 20u will now be described.

The holder 20u includes, for example, a holding member 20, a first extension portion 26, and a second extension portion 27. The holding member 20 extends in a first direction D1. The holding member 20 has a first end 20a and a second end 20b. The second end 20b is separated from the first end 20a in the first direction D1. The holding member 20 has a first portion 21 and a second portion 22.

The holding member 20 has a midpoint 20c in the first direction D1. The first portion 21 is positioned between the midpoint 20c and the first end 20a. The second portion 22 is positioned between the midpoint 20c and the second end 20b. The first direction D1 corresponds to, for example, the left and right direction of the user.

The first direction D1 is taken as an X-axis direction. One axis perpendicular to the X-axis direction is taken as a Y-axis direction. A direction perpendicular to the X-axis direction and the Y-axis direction is taken as a Z-axis direction.

For example, the portion of glasses that holds the lenses is used as the holding member 20. The first portion 21 may include a first lens unit 21L. The second portion 22 may include a second lens unit 22L. The lens units may include lenses for correcting vision. The lens units may include filters that attenuate light. In other words, sunglasses may be used as the holder 20u.

The first extension portion 26 is connected to the first end 20a of the holding member 20. The first extension portion 26 extends in a direction D21 intersecting the first direction D1. For example, the first extension portion 26 has one end 26a and one other end 26b. The one end 26a is connected to the first end 20a. The one other end 26b is separated from the one end 26a in the direction D21. The first extension portion 26 is, for example, a fixing unit for the right ear. The first extension portion 26 is, for example, a temple unit on the right side. The direction D21 substantially corresponds to the frontward and rearward direction of the user.

The second extension portion 27 is connected to the second end 20b of the holding member 20. The second extension portion 27 is arranged with the first extension portion 26 in the first direction D1. The second extension portion 27 extends in a direction D22 intersecting the first direction D1. For example, the second extension portion 27 has a third end 27a and a fourth end 27b. The third end 27a is connected to the second end 20b. The fourth end 27b is separated from the third end 27a in the direction D22 in which the second extension portion 27 extends. The second extension portion 27 is, for example, a fixing unit for the left ear. The second extension portion 27 is, for example, a temple unit on the left side. The direction D22 substantially corresponds to the frontward and rearward direction of the user.

The direction D21 and the direction D22 may not be strictly parallel to each other. The temple unit on the right side may not be strictly parallel to the temple unit on the left side; and the directions of the temple units may intersect such that the temple units spread from each other.

The angle between the X-Y plane and the plane including the direction D21 and the direction D22 is small. The angle is smaller than the angle between the Z-axis direction and the plane including the direction D21 and the direction D22.

The image display device 10 is mounted on such a holder 20u. In the example, the image display device 10 is mounted on the right side (the first portion 21 side) of the holder 20u. In the embodiment, the image display device 10 may be mounted on the left side (the second portion 22 side) of the holder 20u. In such a case, the first portion 21 and the second portion 22 may be interchanged in the following description.

An example in which the image display device 10 is mounted on the right side (the first portion 21 side) of the holder 20u will now be described.

The image display device 10 includes a light emitting unit 11 and an optical unit 12. In the example, the light emitting unit 11 is mounted on the first extension portion 26 (e.g., the temple unit on the right side). The light emitting unit 11 emits light including an image. The optical unit 12 is mounted on the first portion 21. In the example, the first extension portion 26 is disposed between the light emitting unit 11 and the second extension portion 27. The light emitting unit 11 and the optical unit 12 are disposed outside the region partitioned by the holding member 20, the first extension portion 26, and the second extension portion 27.

The optical unit 12 changes the travel direction of the light emitted from the light emitting unit 11 to a direction intersecting the first direction D1 by reflecting the light. The light for which the travel direction is changed by the optical unit 12 is incident on an eye (in this case, the right eye) of the user. The user views the image information included in the light emitted from the optical unit 12.

Thus, the head mounted display 110 displays the image on one eye of the user. To this end, the image display device 10 is provided on the left or right side (in the example, the right side) of the user. Therefore, one side (e.g., the right side) becomes heavier than the other side (e.g., the left side). The user has pronounced discomfort when the difference between the weight of the two sides becomes excessively large. In particular, usage over a long period of time becomes difficult when there is discomfort.

The inventor of the application focused on the difference between the weight in the left and right direction and discovered that the discomfort is substantially suppressed by appropriately setting this difference.

For example, the sum of the weight of the light emitting unit 11, the weight of the optical unit 12, the weight of the first portion 21, and the weight of the first extension portion 26 is taken as a first total weight W1. The first total weight W1 is the weight of the side (in the example, the right side) on which the image display device 10 is provided. On the other hand, the sum of the weight of the second portion 22 and the weight of the second extension portion 27 is taken as a second total weight W2. The second total weight W2 is the weight of the side (in the example, the left side) on which the image display device 10 is not provided. The ratio of the first total weight W1 to the second total weight W2 is a right/left ratio R1 (R1=W1/W2).

In the embodiment, the first total weight W1 is set to be 3.5 times the second total weight W2 or less. In other words, the right/left ratio R1 is set to be 3.5 or less. Thereby, an image display device and a head mounted display that suppress discomfort during use can be provided.

Experiments performed independently by the inventor of the application to derive the configuration of the embodiment will now be described.

The following sample was used in the experiments. The weight of the first portion 21 was 5 g (grams). The weight of the first extension portion 26 was 4 g. The weight of the second portion 22 was 5 g. The weight of the second extension portion 27 was 4 g.

First, in a first experiment, a subjective evaluation by the user was performed by changing the total weight of the weight of the light emitting unit 11 and the weight of the optical unit 12. Here, the weight of the optical unit 12 was constant; and the subjective evaluation was performed by changing the weight of the light emitting unit 11.

As a first evaluation criterion of the subjective evaluation, the discomfort due to the difference between the left and right weight was evaluated. As a second evaluation criterion, the discomfort due to the weight of the entirety was evaluated. Five levels of ratings were provided for these evaluation criteria. Rating "1" was "very annoying." Rating "2" was "annoying." Rating "3" was "slightly annoying." Rating "4" was "perceptible, but not annoying." Rating "5" was "imperceptible." The discomfort is high when the value of the evaluation rating is low. The discomfort is low and is not bad when the value of the evaluation rating is high.

In the evaluation, a stationary state ST1 and a walking state ST2 were tested as states of the user (the participant). In the stationary state ST1, the user wears the head mounted display and is stationary. In the walking state ST2, the user wears the head mounted display and is walking.

Figure 3:
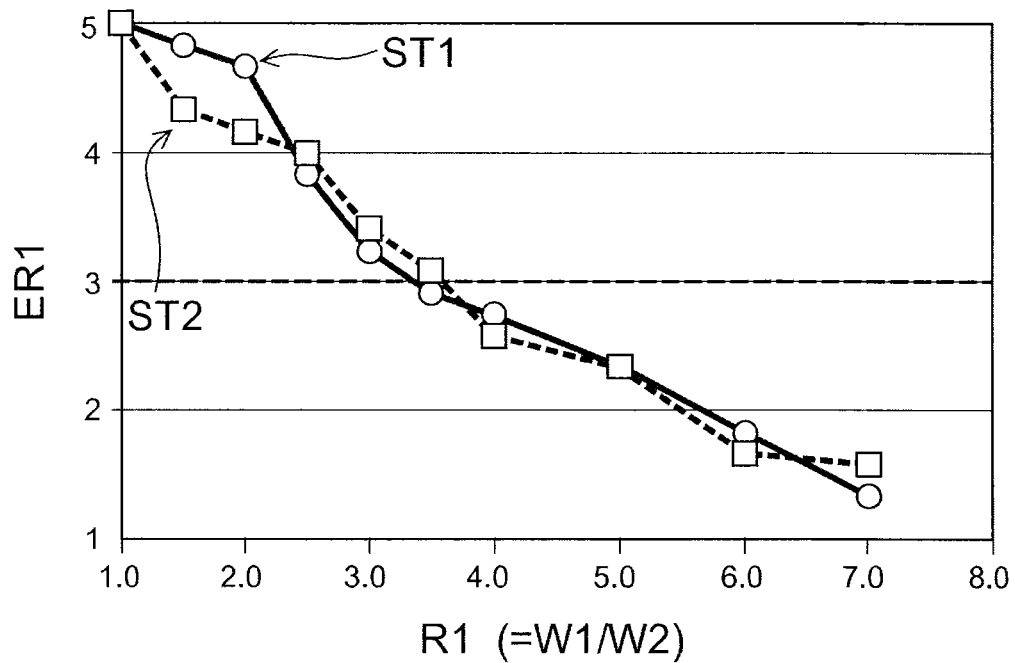
FIG. 3 is a graph showing characteristics of the image display device and the head mounted display according to the first embodiment.

FIG. 3 is a graph showing characteristics of the image display device and the head mounted display according to the first embodiment.

FIG. 3 shows the results of the evaluation (the first evaluation criterion) of the discomfort due to the difference between the left and right weight. In FIG. 3, the horizontal axis is the right/left ratio R1. The vertical axis is an evaluation rating ER1 of the results of the subjective evaluation relating to the first evaluation criterion.

It can be seen from FIG. 3 that the evaluation rating ER1 is "3" or higher when the right/left ratio R1 is 3.5 or less. In other words, for this condition, the discomfort due to the difference between the left and right weight is at a tolerable level.

Figure 4:
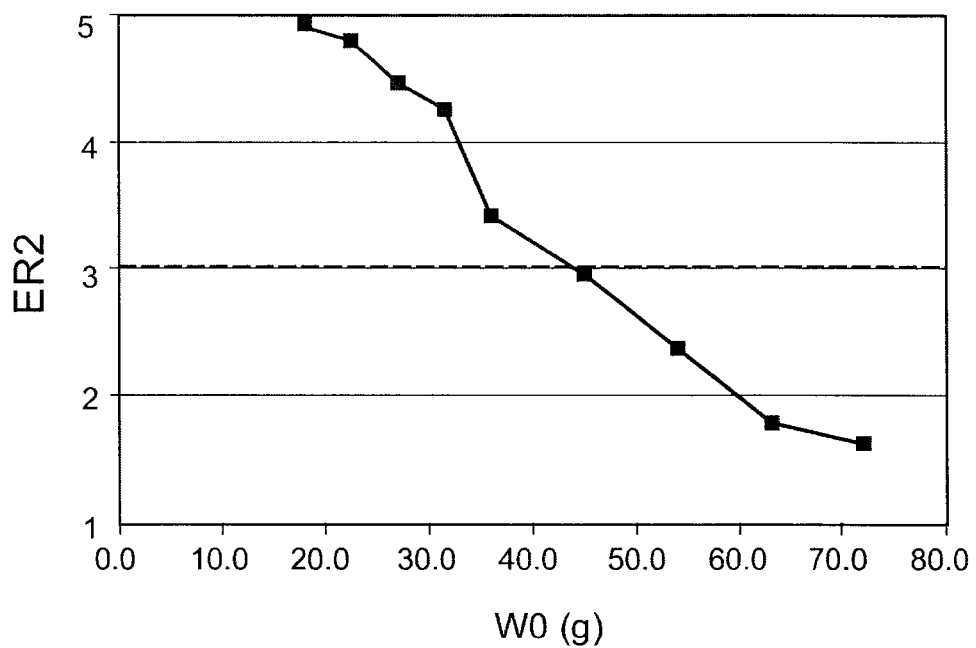
FIG. 4 is a graph showing a characteristic of the image display device and the head mounted display according to the first embodiment.

FIG. 4 is a graph showing a characteristic of the image display device and the head mounted display according to the first embodiment.

FIG. 4 shows the result of the evaluation (the second evaluation criterion) of the discomfort due to the weight of the entirety. In FIG. 4, the horizontal axis is a weight W0 (grams) of the entirety. The weight W0 of the entirety is the sum of the first total weight W1 and the second total weight W2. The vertical axis is an evaluation rating ER2 of the result of the subjective evaluation relating to the second evaluation criterion.

It can be seen from FIG. 4 that the evaluation rating ER2 becomes "3" or higher when the weight W0 of the entirety is about 45 g or less. In other words, for this condition, the discomfort due to the weight of the entirety is at a tolerable level.

From the results shown in FIG. 3, the right/left ratio R1 is set to be 3.5 or less in the embodiment. Thereby, the discomfort due to the difference between the left and right weight is at a tolerable level. On the other hand, from the result shown in FIG. 4, the weight W0 of the entirety is set to be 45 g or less. Thereby, the weight of the entirety also is at a tolerable level.

For the head mounted display that displays the image on the one eye, the weight balance degrades easily; and the glasses (the device) easily tilt left and right or frontward and rearward. In the embodiment, a specific weight distribution is presented to improve the poor balance that occurs when mounting the head mounted display to the head of the user. According to the embodiment, the wearability of the head mounted display can be improved; and the discomfort can be suppressed. According to the embodiment, a head mounted display that can be mounted for a long period of time can be provided.

In the case where the difference between the left and right weight (i.e., the right/left ratio R1) is small, the discomfort due to the difference between the left and right weight is small. If, in such a case, the image display device 10 is extremely light compared to the holder 20u, the right/left ratio R1 is small. However, practically, the image display device 10 is sufficiently heavy compared to the holder 20u such that the weight of the image display device 10 cannot be ignored. Therefore, there is a practical limitation on reducing the right/left ratio R1.

On the other hand, by focusing on only reducing the right/left ratio R1, it may be considered to provide a weight on the side opposite to the side on which the image display device 10 is mounted. Because the image display device 10 is mounted on the first portion 21 side in the example, it may be considered to provide the weight on the second portion 22 side (e.g., at the second extension portion 27). Then, for example, by setting the weight of the weight to be the same as the weight of the image display device 10, the right/left ratio R1 can be reduced, that is, can be set to be 1. However, in such a configuration, the weight of the entire head mounted display undesirably increases by the amount of the weight of the weight. Therefore, even if the discomfort due to the difference between the left and right weight is reduced, the discomfort due to the weight of the entirety undesirably increases.

The results of a subjective evaluation (a second experiment) in the case where the weight is provided on the second portion 22 side (e.g., at the second extension portion 27) will now be described. In the second experiment, the weight of the image display device 10 (i.e., the total of the weight of the light emitting unit 11 and the weight of the optical unit 12) was set to be constant at 36 g; and in such a case, the subjective evaluation by the user was performed by changing the weight of the weight provided at the second extension portion 27.

Figure 5A:
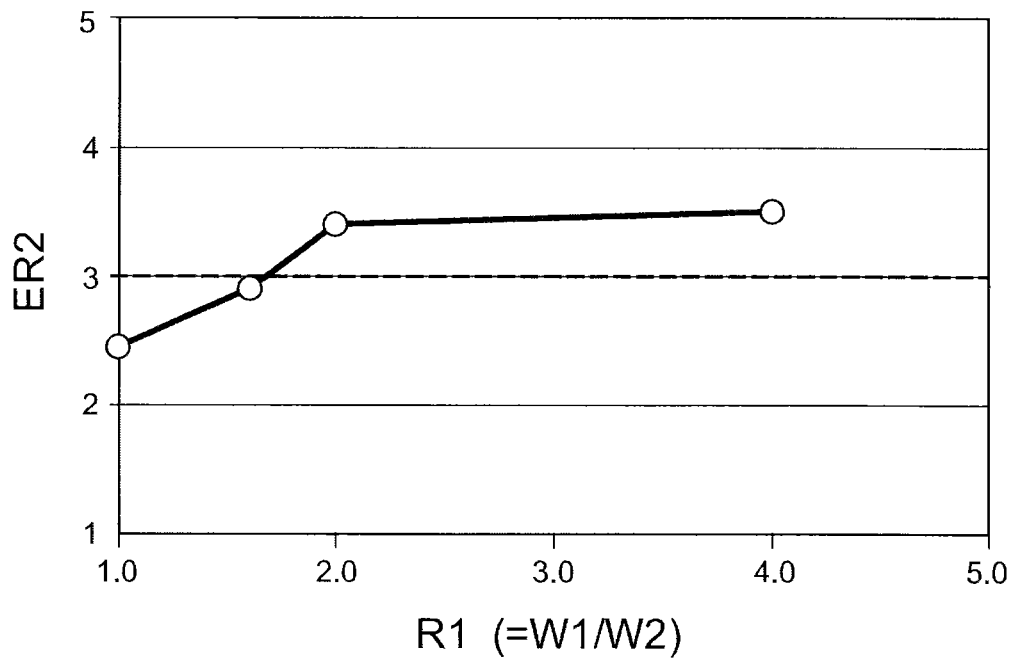
FIG. 5A and FIG. 5B are graphs showing characteristics of the image display device and the head mounted display according to the first embodiment.
Figure 5B:
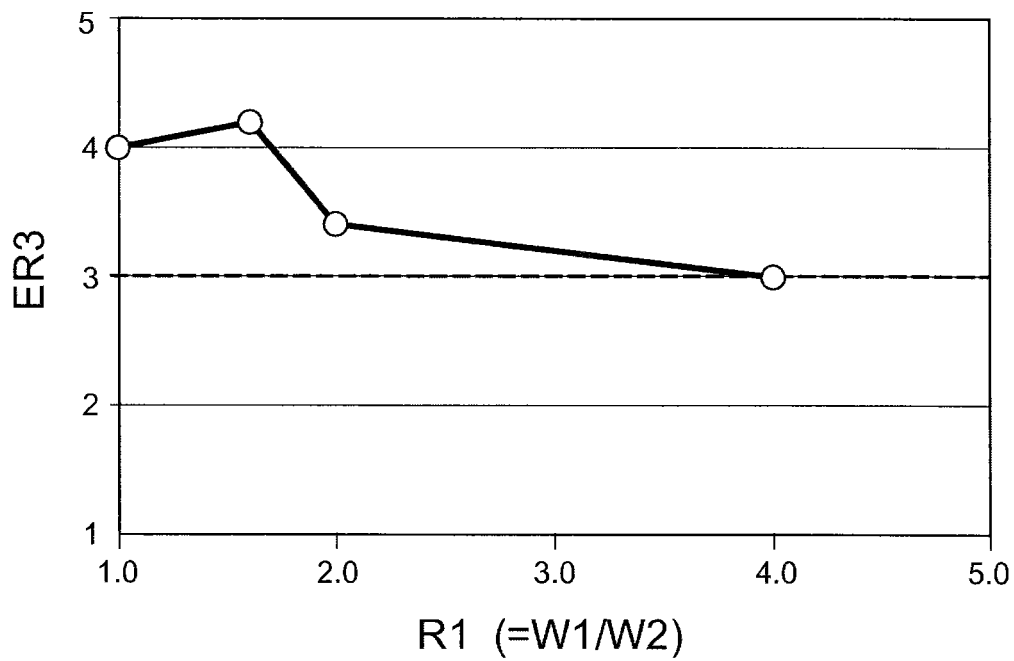

FIG. 5A and FIG. 5B are graphs showing characteristics of the image display device and the head mounted display according to the first embodiment.

FIG. 5A shows the result of the evaluation (the second evaluation criterion) of the discomfort due to the weight of the entirety. FIG. 5B shows the result of an evaluation (a third evaluation criterion) of the overall discomfort due to both the weight of the entirety and the difference between the left and right weight. In these drawings, the horizontal axis is the right/left ratio R1. In FIG. 5A, the vertical axis is the evaluation rating ER2 of the result of the subjective evaluation relating to the second evaluation criterion. In FIG. 5B, the vertical axis is an evaluation rating ER3 of the result of the subjective evaluation relating to the third evaluation criterion. In these drawings, the right/left ratio R1 being small corresponds to the weight of the weight being large. The right/left ratio R1 being 1 corresponds to the weight of the weight being equal to the weight of the image display device 10.

It can be seen from FIG. 5A that, in the case of the second experiment in which the weight of the weight is changed, the discomfort due to the weight of the entirety increases when the right/left ratio R1 is small. From FIG. 5A, the evaluation rating ER2 is "3" or higher when the right/left ratio R1 is 1.6 or more. In other words, for this condition, the discomfort due to the weight of the entirety is at a tolerable level.

On the other hand, it can be seen from FIG. 5B that, in the case of the second experiment in which the weight of the weight is changed, the evaluation (the third evaluation criterion) of the overall discomfort due to both the weight of the entirety and the difference between the left and right weight becomes a maximum when the right/left ratio R1 is about 1.6. It is considered that the overall discomfort decreases in the second experiment when the right/left ratio R1 becomes excessively low because the evaluation rating ER2 relating to the weight degrades when the right/left ratio R1 becomes low.

Accordingly, from a practical aspect, it is favorable for the right/left ratio R1 to be not less than 1.6 and not more than 3.5.

In the embodiment, a practical head mounted display can be provided by reducing the discomfort due to the increase of the weight of the entirety without excessively reducing the right/left ratio R1. Specifically, the right/left ratio R1 is set to be not less than 1.6 and not more than 3.5. In other words, the first total weight is set to be not less than 1.6 times and not more than 3.5 times the second total weight. Thereby, the discomfort due to the difference between the left and right weight can be suppressed without the weight of the entirety becoming excessively large. Thereby, an image display device and a head mounted display that suppress discomfort during use can be provided.

Figure 6:
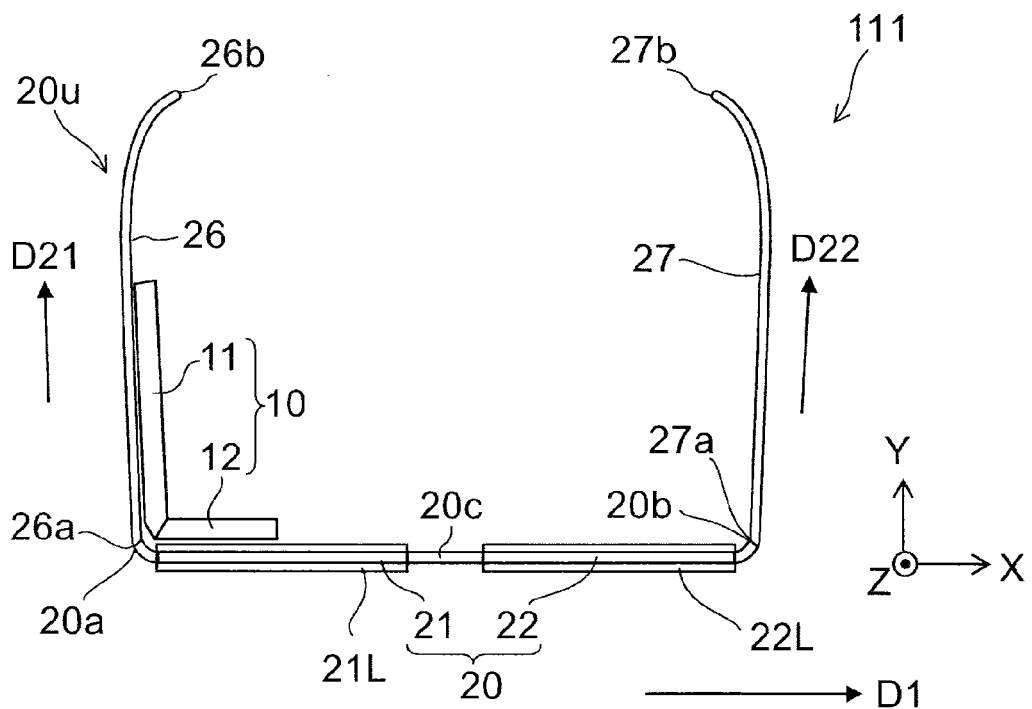
FIG. 6 is a schematic plan view showing another image display device and head mounted display according to the first embodiment.

FIG. 6 is a schematic plan view showing another image display device and head mounted display according to the first embodiment.

As shown in FIG. 6, the head mounted display 111 according to the embodiment also includes the image display device 10 and the holder 20u. In the example, the light emitting unit 11 is disposed between the first extension portion 26 and the second extension portion 27. The light emitting unit 11 and the optical unit 12 are disposed inside the region partitioned by the holding member 20, the first extension portion 26, and the second extension portion 27.

In the example as well, the right/left ratio R1 is set to be not less than 1.6 and not more than 3.5. Thereby, the discomfort due to the difference between the left and right weight can be suppressed without the weight of the entirety becoming excessively large. Thereby, an image display device and a head mounted display that suppress discomfort during use can be provided.

Figure 7:
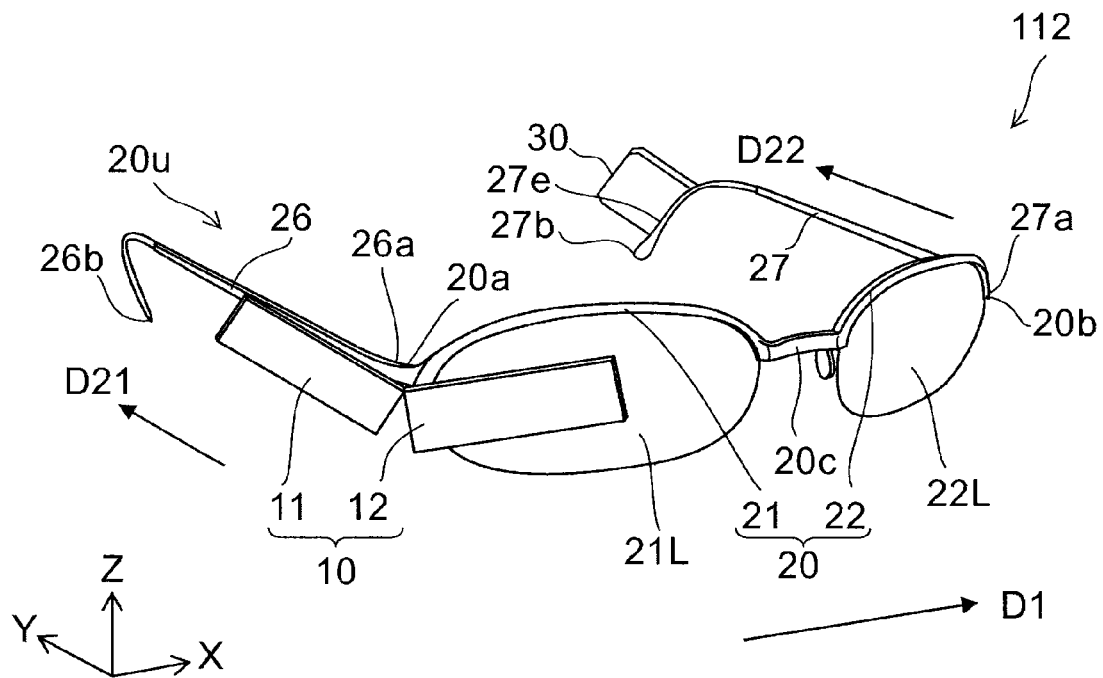
FIG. 7 is a schematic plan view showing another image display device and head mounted display according to the first embodiment.

FIG. 7 is a schematic plan view showing another image display device and head mounted display according to the first embodiment.

As shown in FIG. 7, a weight unit 30 is further provided in the head mounted display 112 according to the embodiment. Otherwise, the head mounted display 112 is similar to the head mounted display 110.

As shown in FIG. 7, the second extension portion 27 has the third end 27a that is connected to the second end 20b, and the fourth end 27b that is separated from the third end 27a in the direction D22 in which the second extension portion 27 extends. The second extension portion 27 has an end portion 27e that includes the fourth end 27b.

The holder 20u further includes the weight unit 30 that is provided at the end portion 27e. The end portion 27e where the weight unit 30 is provided is a portion contacting the ear of the user or a portion rearward of the portion contacting the ear of the user.

In such a head mounted display 112, a third total weight W3 is taken as the sum of the weight of the second portion 22, the weight of the second extension portion 27, and the weight of the weight unit 30. In such a case, the right/left ratio R1 is W1/W3.

In such a case, the right/left ratio R1 can be 2 or less. In other words, by providing the weight unit 30, the first total weight W1 can be twice the third total weight W3 or less.

By providing the weight unit 30, the discomfort is suppressed further.

The configuration of the weight unit 30 is arbitrary. For example, the weight unit 30 may be considered to be provided in the case where the weight of the end portion 27e including the fourth end 27b of the second extension portion 27 is greater than the weight of the end portion including the one other end 26b of the first extension portion 26.

Second Embodiment

Figure 8:
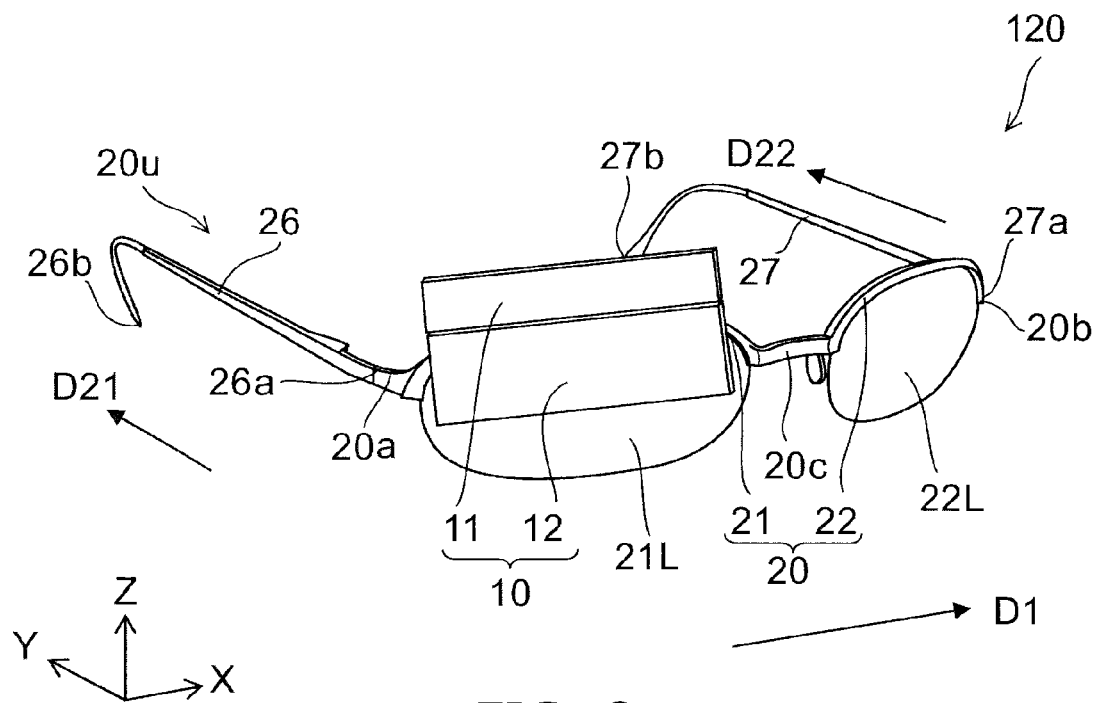
FIG. 8 is a schematic perspective view showing an image display device and a head mounted display according to a second embodiment.

FIG. 8 is a schematic perspective view showing an image display device and a head mounted display according to a second embodiment.

Figure 9:
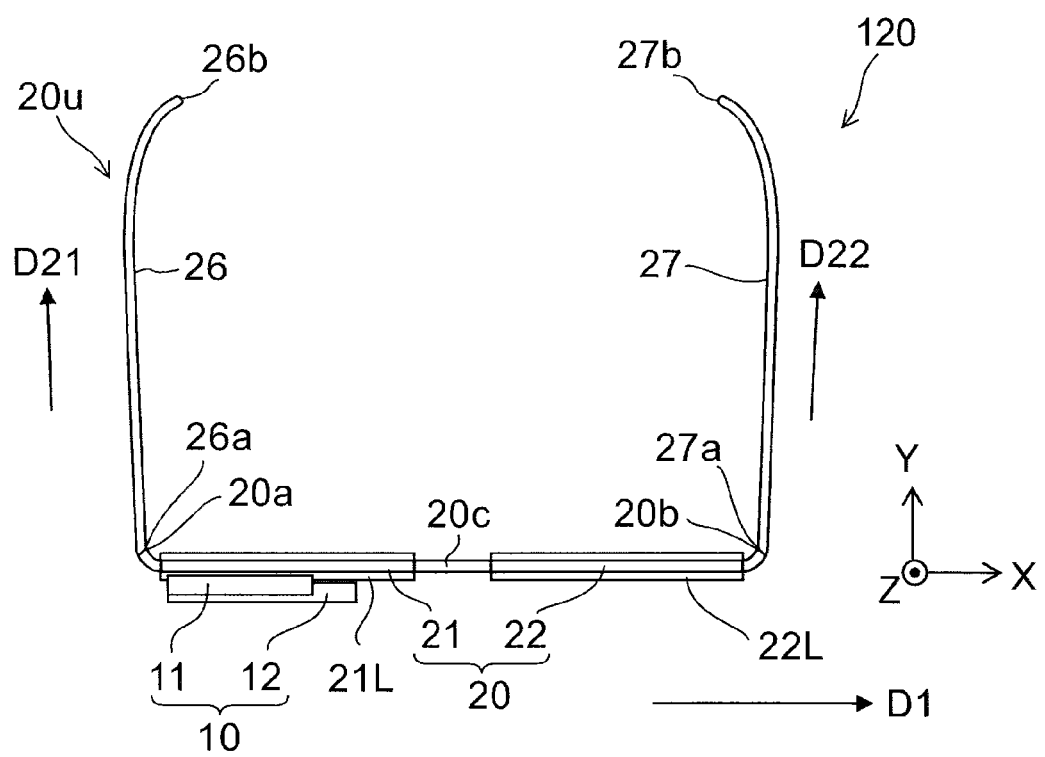
FIG. 9 is a schematic plan view showing the image display device and the head mounted display according to the second embodiment.

FIG. 9 is a schematic plan view showing the image display device and the head mounted display according to the second embodiment.

As shown in FIG. 8 and FIG. 9, the head mounted display 120 according to the embodiment also includes the image display device 10 and the holder 20u. In such a case as well, the holding member 20 has the first portion 21 and the second portion 22. The image display device 10 includes the light emitting unit 11 and the optical unit 12.

In the embodiment, both the light emitting unit 11 and the optical unit 12 are mounted on the first portion 21. Otherwise, the configuration of the head mounted display 120 may be similar to that of the head mounted display 110; and a description is therefore omitted.

The results when the experiments described in regard to the first embodiment were performed for the head mounted display 120 having such a configuration will now be described.

Figure 10:
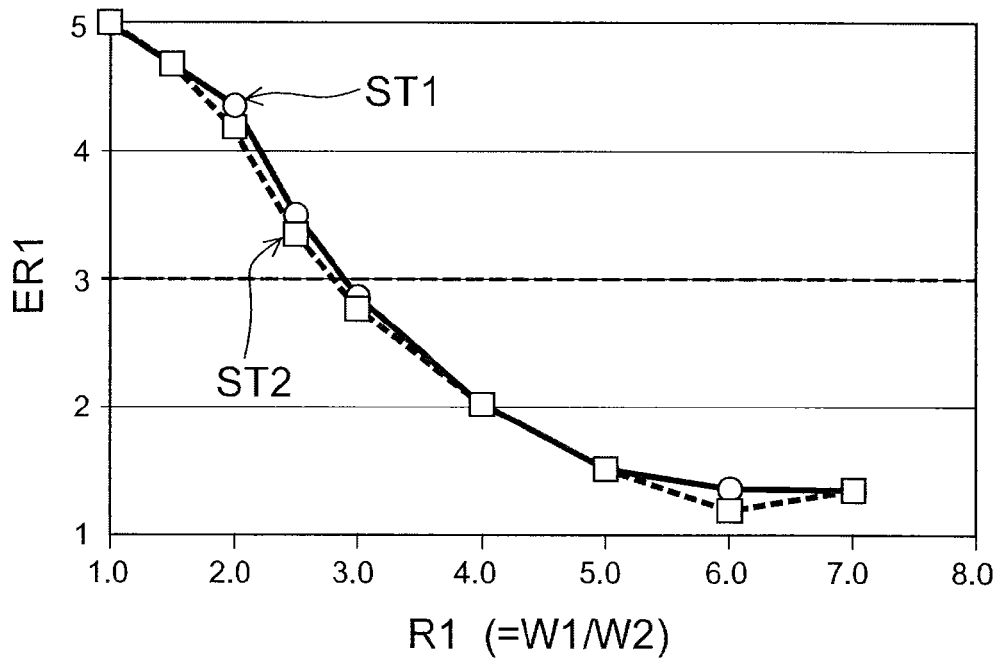
FIG. 10 is a graph showing characteristics of the image display device and the head mounted display according to the second embodiment.

FIG. 10 is a graph showing characteristics of the image display device and the head mounted display according to the second embodiment.

FIG. 10 shows the results of the evaluation (the first evaluation criterion) of the discomfort due to the difference between the left and right weight. In FIG. 10, the horizontal axis is the right/left ratio R1. The vertical axis is the evaluation rating ER1 of the results of the subjective evaluation.

It can be seen from FIG. 10 that, for the configuration of the head mounted display 120, the evaluation rating ER1 is "3" or higher when the right/left ratio R1 is 3 or less. In other words, for this condition, the discomfort due to the difference between the left and right weight is at a tolerable level.

Figure 11:
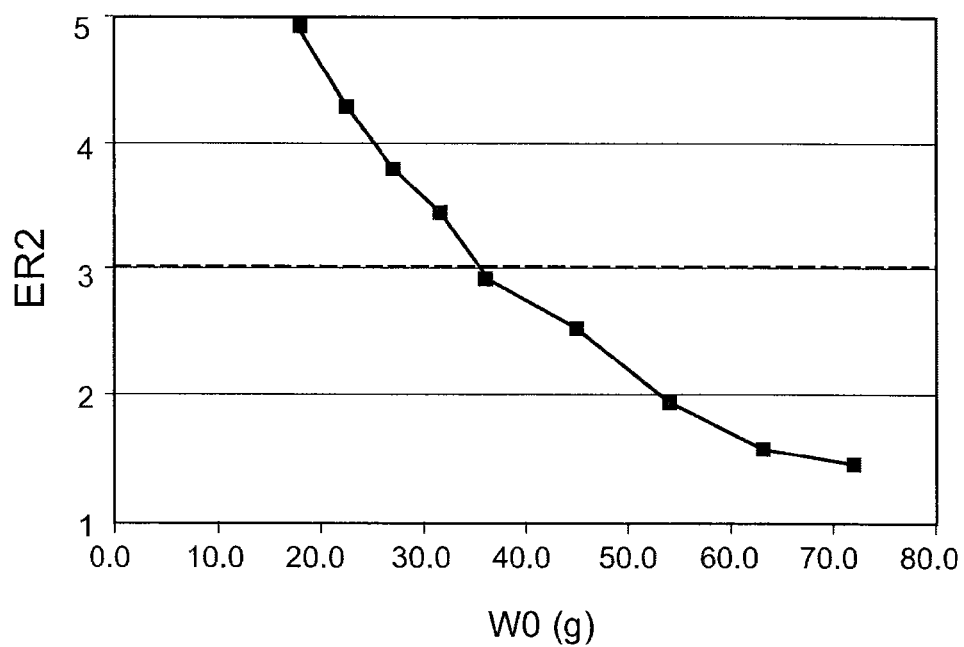
FIG. 11 is a graph showing a characteristic of the image display device and the head mounted display according to the second embodiment.

FIG. 11 is a graph showing a characteristic of the image display device and the head mounted display according to the second embodiment.

FIG. 11 shows the result of the evaluation (the second evaluation criterion) of the discomfort due to the weight of the entirety. In FIG. 11, the horizontal axis is the weight W0 of the entirety. The vertical axis is the evaluation rating ER2 of the result of the subjective evaluation.

It can be seen from FIG. 11 that the evaluation rating ER2 becomes "3" or higher when the weight W0 of the entirety is about 35 g or less. In other words, for this condition, the discomfort due to the weight of the entirety is at a tolerable level.

From the results shown in FIG. 10, the right/left ratio R1 is set to be 3 or less in the embodiment. Thereby, the discomfort due to the difference between the left and right weight is at a tolerable level. On the other hand, from the result shown in FIG. 11, the weight W0 of the entirety is set to be 35 g or less. Thereby, the weight of the entirety also is at a tolerable level.

In such a case as well, a practical head mounted display can be provided by reducing the discomfort due to the increase of the weight of the entirety without excessively reducing the right/left ratio R1. Specifically, in the embodiment, the right/left ratio R1 is set to be not less than 1.6 and not more than 3. Thereby, the discomfort due to the difference between the left and right weight can be suppressed without the weight of the entirety becoming excessively large. Thereby, an image display device and a head mounted display that suppress discomfort during use can be provided.

As recited above, the right/left ratio R1 is not more than 3.5 in the first embodiment; and the right/left ratio R1 is not more than 3 in the second embodiment. This difference relates to the difference between the positions of the center of gravity of the image display device 10 for the two embodiments. In other words, in the first embodiment, the position of the center of gravity of the image display device 10 along the direction D21 is positioned at a position along the direction D21 between the one end 26a and the one other end 26b of the first extension portion 26 because the light emitting unit 11 is mounted on the first extension portion 26. On the other hand, in the second embodiment, the position of the center of gravity of the image display device 10 along the direction D21 substantially matches the position of the one other end 26b along the direction D21 because the light emitting unit 11 is mounted on the first portion 21. In other words, the frontward/rearward-direction position of the center of gravity of the image display device 10 of the first embodiment is rearward of the frontward/rearward-direction position of the center of gravity of the image display device 10 of the second embodiment. The balance of the center of gravity in the frontward and rearward direction is better for the first embodiment. Therefore, it is considered that the tolerance of the left and right balance is higher in the first embodiment than in the second embodiment.

In the embodiment as well, the holder 20u may further include the weight unit 30 provided at the end portion 27e. The end portion 27e where the weight unit 30 is provided is a portion contacting the ear of the user or a portion rearward of the portion contacting the ear of the user. By providing the weight unit 30, the right/left ratio R1 can be 2 or less. By providing the weight unit 30, the discomfort is suppressed further.

In the embodiments recited above, the light emitting unit 11 may include a light source and a light switching device. The light source may include, for example, at least one selected from an LED (Light Emitting Diode) and a LD (Laser Diode). The light switching device may include, for example, at least one selected from an LCD (Liquid Crystal Display), MEMS (Micro Electro Mechanical Systems), an optical lens, etc. The optical unit 12 may include, for example, at least one selected from a half mirror, a Fresnel mirror, a lens array, and a HOE (Holographic Optical Element).

According to the embodiment, an image display device and a head mounted display that suppress discomfort during use can be provided.

Hereinabove, embodiments of the invention are described with reference to specific examples. However, the invention is not limited to these specific examples. For example, one skilled in the art may similarly practice the invention by appropriately selecting specific configurations of components included in the head mounted display such as the image display device, the light emitting unit, the optical unit, the holder, the holding member, the first extension portion, the second extension portion, the weight unit, etc., from known art; and such practice is within the scope of the invention to the extent that similar effects are obtained.

Further, any two or more components of the specific examples may be combined within the extent of technical feasibility and are included in the scope of the invention to the extent that the purport of the invention is included.

Moreover, all image display devices and head mounted displays practicable by an appropriate design modification by one skilled in the art based on the image display devices and the head mounted displays described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A head mounted display, comprising:
   a holder including
      a holding member extending in a first direction, the holding member having a first end, a second end separated from the first end in the first direction, the holding member including a first portion positioned between the first end and a midpoint of the holding member in the first direction, and a second portion positioned between the midpoint and the second end,
      a first extension portion extending in a direction intersecting the first direction to be connected to the first end, and
      a second extension portion extending in a direction intersecting the first direction to be connected to the second end and arranged with the first extension portion in the first direction; and
   an image display device including
      a light emitting unit configured to be mounted on the first extension portion, the light emitting unit being configured to emit light including an image, and
      an optical unit configured to be mounted on the first portion, the optical unit being configured to change a travel direction of the light emitted from the light emitting unit to a direction intersecting the first direction by reflecting the light,
   a first total weight being not less than 1.6 times and not more than 3.5 times a second total weight, the first total weight being a sum of a weight of the light emitting unit, a weight of the optical unit, a weight of the first portion, and a weight of the first extension portion, the second total weight being a sum of a weight of the second portion and a weight of the second extension portion,
   wherein
   the second extension portion has a third end connected to the second end, and a fourth end separated from the third end in the extension direction of the second extension portion,
   the holder further includes a weight unit provided at an end portion of the holder including the fourth end, and
   the first total weight is not more than twice a third total weight, the third total weight being the sum of the weight of the second portion, the weight of the second extension portion, and a weight of the weight unit.

2. The display according to claim 1, wherein a total of the first total weight and the second total weight is not more than 45 grams.

3. The display according to claim 1, wherein the first portion includes a lens unit.

4. The display according to claim 1, wherein the first portion includes a filter configured to attenuate light.

5. A head mounted display, comprising:
   a holder including
      a holding member extending in a first direction, the holding member having a first end, a second end separated from the first end in the first direction, the holding member including a first portion positioned between the first end and a midpoint of the holding member in the first direction, and a second portion positioned between the midpoint and the second end,
      a first extension portion extending in a direction intersecting the first direction to be connected to the first end, and
      a second extension portion extending in a direction intersecting the first direction to be connected to the second end and arranged with the first extension portion in the first direction; and
   an image display device including
      a light emitting unit configured to be mounted on the first portion, the light emitting unit being configured to emit light including an image, and
      an optical unit configured to be mounted on the first portion, the optical unit being configured to change a travel direction of the light emitted from the light emitting unit to a direction intersecting the first direction by reflecting the light,
   a first total weight being not less than 1.6 times and not more than 3 times a second total weight, the first total weight being a sum of a weight of the light emitting unit, a weight of the optical unit, a weight of the first portion, and a weight of the first extension portion, the second total weight being a sum of a weight of the second portion and a weight of the second extension portion,
   wherein
   the second extension portion has a third end connected to the second end, and a fourth end separated from the third end in the extension direction of the second extension portion,
   the holder further includes a weight unit provided at an end portion of the holder including the fourth end, and
   the first total weight is not more than twice a third total weight, the third total weight being the sum of the weight of the second portion, the weight of the second extension portion, and a weight of the weight unit.

6. The display according to claim 5, wherein the total of the first total weight and the second total weight is not more than 35 grams.

7. The display according to claim 5, wherein the first portion includes a lens unit.

8. The display according to claim 5, wherein the first portion includes a filter configured to attenuate light.

* * * * *